United States Patent
Borufka et al.

(10) Patent No.: US 9,022,727 B2
(45) Date of Patent: May 5, 2015

(54) ROTOR FOR A TURBO MACHINE

(75) Inventors: Hans Peter Borufka, Starnberg (DE); Frank Stiehler, Bad Liebenwerda (DE)

(73) Assignee: MTU Aero Engines GmbH, Munich (DE)

( * ) Notice: Subject to any disclaimer, the term of this patent is extended or adjusted under 35 U.S.C. 154(b) by 542 days.

(21) Appl. No.: 13/294,847

(22) Filed: Nov. 11, 2011

(65) Prior Publication Data

US 2012/0121436 A1 May 17, 2012

(30) Foreign Application Priority Data

| | | |
|---|---|---|
| Nov. 15, 2010 | (EP) | 10191243 |
| Nov. 17, 2010 | (EP) | 10191460 |
| Nov. 17, 2010 | (EP) | 10191461 |
| Nov. 17, 2010 | (EP) | 10191462 |

(51) Int. Cl.

| | |
|---|---|
| *F01D 5/18* | (2006.01) |
| *F04D 29/32* | (2006.01) |
| *F01D 5/22* | (2006.01) |
| *F01D 11/00* | (2006.01) |
| *F04D 29/66* | (2006.01) |

(52) U.S. Cl.
CPC ......... F04D 29/321 (2013.01); *Y10T 29/49318* (2015.01); *Y10T 29/49321* (2015.01); F01D 5/187 (2013.01); F01D 5/22 (2013.01); F01D 11/006 (2013.01); F04D 29/668 (2013.01); *Y02T 50/671* (2013.01); *Y02T 50/673* (2013.01); *Y02T 50/676* (2013.01)

(58) Field of Classification Search
CPC ......... F01D 5/22; F01D 5/187; F01D 11/006; F04D 29/321; F04D 29/668
USPC ....... 415/115, 119; 416/95, 96 R, 96 A, 97 R, 416/144–145, 190–191, 193 A, 234, 239, 416/248, 500
See application file for complete search history.

(56) References Cited

U.S. PATENT DOCUMENTS

| | | | | |
|---|---|---|---|---|
| 2,920,865 | A * | 1/1960 | Lombard | 416/97 R |
| 2,945,671 | A * | 7/1960 | Petrie | 415/115 |
| 3,627,443 | A * | 12/1971 | Pirzer | 416/97 R |
| 3,918,842 | A * | 11/1975 | Longley et al. | 416/193 A |
| 4,178,129 | A * | 12/1979 | Jenkinson | 416/95 |
| 4,447,190 | A * | 5/1984 | Campbell | 416/95 |
| 4,457,668 | A * | 7/1984 | Hallinger | 416/95 |
| 4,743,164 | A * | 5/1988 | Kalogeros | 416/193 A |
| 5,151,012 | A * | 9/1992 | Hough | 416/95 |

(Continued)

FOREIGN PATENT DOCUMENTS

| | | |
|---|---|---|
| EP | 1795703 A2 | 6/2007 |
| WO | 2009008944 A2 | 1/2009 |
| WO | 2010088882 A2 | 8/2010 |

*Primary Examiner* — Christopher Verdier
(74) *Attorney, Agent, or Firm* — Barlow, Josephs & Holmes, Ltd.

(57) ABSTRACT

A rotor (13) for a turbo machine, in particular for an aircraft turbine, has rotating blades (12), which are joined to a basic rotor body (14), in which at least one rotating blade (12) has at least one inner cooling channel, which extends at least along a predominant region of a blade element (18) of rotating blade (12) and has an inlet opening (23) for introducing cooling air into blade element (18), in which the inlet opening (23) is formed in a blade neck (16) lying between a blade foot (32) and a blade platform (10) of rotating blade (12). Inlet opening (23) is disposed in a cavity (22) formed radially underneath blade platform (10).

11 Claims, 2 Drawing Sheets

(56) References Cited

U.S. PATENT DOCUMENTS

| | | | |
|---|---|---|---|
| 5,281,097 A | 1/1994 | Wilson et al. | |
| 5,573,375 A * | 11/1996 | Barcza | 416/193 A |
| 5,785,499 A * | 7/1998 | Houston et al. | 416/248 |
| 5,924,699 A * | 7/1999 | Airey et al. | 416/248 |
| 5,941,687 A * | 8/1999 | Tubbs | 416/97 R |
| 5,957,660 A * | 9/1999 | Evans et al. | 416/97 R |
| 2005/0111980 A1 * | 5/2005 | Negulescu et al. | 416/97 R |
| 2005/0232780 A1 | 10/2005 | Newman | |
| 2011/0255991 A1 * | 10/2011 | Borufka et al. | 416/97 R |

* cited by examiner

ROTOR FOR A TURBO MACHINE

BACKGROUND OF THE INVENTION

The invention relates to a rotor, a blade or vane as well as a turbo machine having a rotor.

In turbo machines, such as aircraft turbines, for example, which are used in a number of variants in aircraft, but also in different types of aircraft and in stationary applications, continually higher temperatures are targeted in the one or more internal combustion chambers, in order to obtain an improved efficiency. In the high-pressure part of the aircraft turbine that is connected downstream of the internal combustion chamber, all open surfaces of guide vanes and rotating blades as well as other components that lay open are therefore subjected to temperatures that can lie partially in the region of the melting point of the materials used. In order to be able to operate an aircraft turbine at a temperature that is as high as possible, the components and, in particular, the vanes and blades subjected to the hot gas flow are cooled by means of inner-lying cooling channels as well as by a so-called film cooling.

EP 1 795 703 A2 discloses a bladed rotor, in which, underneath its respective blade platform, each rotating blade has a cooling chamber, into which cooling air is guided during the operation of the associated turbine. Each rotating blade has one or more inlet openings at the bottom of its blade foot for introducing cooling air into cooling channels, these openings found inside the rotating blade, extending from the blade foot into a blade element formed radially above the blade platform. The blade element in its turn has several outlet openings, through which the cooling air can exit again from the rotating blade. For introducing cooling air into the cooling chamber, the blade neck of the rotating blade comprises another channel, which extends between the cooling channel and the cooling chamber within the rotating blade. On its end facing away from the blade neck of the rotating blade, the cooling chamber is sealed by means of a damping element and has one or more outlet openings in the blade platform, through which the cooling air can exit. Alternatively, it is provided that the cooling chamber is fluidically decoupled from the inner cooling channel of the rotating blade and is provided with cooling air through inlet openings in the damping element.

US 2005/0232780 A1 describes, for example, an integrally bladed rotor for a turbine, in which inlet openings of inner cooling channels are disposed in each case on the blade neck of a rotating blade. Between blade neck and blade element, the rotating blades comprise blade platforms, which can be welded to one another in the circumferential direction.

Viewed as a disadvantage in the known rotor, however, is the circumstance that an optimal supply of cooling air for the rotating blades is not made possible, since the geometries of the inlet openings are the cause of great restrictions on structure due to the necessary geometries of the blade foot as well as large aerodynamic restrictions based on the necessary configuration of the flow-conducting surfaces in the region of the blade necks.

SUMMARY OF THE INVENTION

The object of the invention is to make possible an improved provision of cooling air for rotating blades of a rotor of a turbo machine.

The object is accomplished according to the invention by a rotor of the present invention, a blade or vane of the present invention, as well as by a turbo machine of the present invention. Advantageous embodiments of the invention are also disclosed herein, in which advantageous embodiments of the rotor are to be viewed as advantageous embodiments of the turbo machine and vice versa.

In the rotor according to the invention, which makes possible an improved provision of cooling air for its rotating blades, it is provided that the inlet opening is disposed in a cavity formed radially underneath the blade platform. In other words, the introduction of cooling air into the cooling channel of the rotating blade takes place radially above the blade neck and radially below the blade platform, relative to the axis of rotation of the rotor. In this way, an optimal geometry can be selected in each case for the inlet opening as well as for the boundary blade regions, since the region between the blade neck and the blade platform brings about only relatively small restrictions on the structure. In addition, a mechanical weakening of the blade foot, by means of which the rotating blade is joined to the basic rotor body, is avoided in this way. A particularly effective introduction of cooling air into the cooling channel of the rotating blade is made possible by means of the cavity, since the cavity can function as a "reservoir" for cooling air. In contrast to conventional rotors, the cooling boundary therefore can be placed radially very far outside and thus close to the gas or flow channel. Nevertheless, a boundary relative to the gas channel of the turbo machine is continually assured, so that the entrance of hot gas into the inner cooling channel of the rotating blade will be reliably prevented. The rotor therefore fulfills the requirements for robustness (robustness requirement). In addition, an introduction of cooling air into the cooling channel with minimum structural damage of the rotating blade is made possible in this way, since the cooling air can be introduced without weakening the blade foot or the joining region between the rotating blade and a rotor disk, a rotor ring, or the like. In this way, it is irrelevant whether the rotor is mounted or designed in an integral construction. In addition, the arrangement of the inlet opening in the cavity according to the invention makes possible an improved adjustment of the temperature gradient both in the basic rotor body as well as in the joining region between the basic rotor body and the rotating blade. The moved mass of the rotor can also be advantageously reduced by means of the cavity. It can be basically provided that several or all rotating blades of the rotor are formed according to the invention.

In another configuration, it is provided that the rotating blades are joined to the basic rotor body in a detachable or cohesive manner. A high structural freedom is achieved in this way, since the rotor can be designed as desired either in mounted construction or in integral BLISK (Bladed Disk) or BLING (Bladed Ring) construction.

In another advantageous embodiment of the invention, it is provided that the blade platform of at least one rotating blade forms a radially inner blade shroud for at least partially bounding a flow channel of the turbo machine. In other words, it is provided that the blade platform defines the radially inner boundary for the hot combustion gases of the turbine stage.

In another advantageous embodiment of the invention, it is provided that a sealing element, by means of which an exchange of flow medium in the radial direction between adjacent rotating blades can be at least reduced, is disposed between two adjacent rotating blades. This makes possible reducing leakages, by which means, for example, the efficiency of a turbo machine assigned to the rotor is advantageously increased. It can be provided that the sealing element is designed in a mirror-symmetrical manner in cross section, in order to make possible a particularly uniform contact to corresponding contact surfaces of adjacent rotating blades.

Further advantages result by disposing a damping element for damping of blade vibrations between two adjacent rotating blades. Here, the damping element is preferably disposed in a position in which displacements of vibrating structures occur that are sufficient for vibration processes. An enlarged structural space is available for the damping element by means of the cavity according to the invention, so that the geometry and the mass of the damping element can be varied correspondingly in a more flexible manner. A similar situation applies to the above-mentioned sealing element, if needed. By arranging the damping element between the blade platforms, due to the relative displacements between the damping element and adjacent rotating blades or blade platforms, a great deal of energy can also be dissipated at critical resonance transitions, for example, due to bending and torsional vibrations, for which reason, the rotor is particularly robust in the mechanical damping sense. In addition, the damping element can be integrated in the rotor in a particularly simple and cost-effective manner in this way, and also can be sparing of structural space. The structural configuration space that is available can therefore be optimally utilized, so that the configuration and size of the damping element can be selected in such a way that design and implementation requirements are completely fulfilled. In this way, the mass of the damping element serves as an optimizing parameter and for definition of switching points between so-called "locked and slipping" states, i.e., between a state of the damping element that is stationary relative to the rotating blade and one that is moveable relative to the rotating blade. The damping element can be very simply mounted and demounted, by which means corresponding cost advantages for manufacture, repair or overhaul of the rotor are achieved. In addition, it is conceivable that the damping element is formed with multiple parts and is moved into the desired position for mounting from the high-pressure or low-pressure side of the rotating blade. In addition, it can be basically provided that one and/or several damping elements are disposed between several and/or all of the blade platforms of the rotor, by which means a particularly flexible adaptability to different requirement profiles and configurations of the rotor is achieved.

Additional advantages result when an inner-lying contact surface in the radially outer region of at least one blade platform is provided, and the sealing element and/or the damping element can be brought into contact with this contact surface, at least in the region of the rotor. Since the damping element and/or the sealing element is or are moved radially upward during the rotation of the rotor, due to the centrifugal force field, it will be assured by this, in a structurally particularly simple way, that the damping element and/or sealing element is reliably applied to the contact surface. The damping and/or sealing effect is additionally improved thereby. The damping and/or sealing effect can be additionally increased by a geometric adaptation of the contact geometry between the damping element and/or sealing element and the contact surface.

In another advantageous embodiment of the invention, it is provided that the sealing element and/or the damping element is arched radially upward along its axial extent. Since the damping element and/or the sealing element is/are moved radially upward during the rotation of the rotor, due to the centrifugal force field, a stable, symmetrical self-alignment of the damping element and/or the sealing element as well as a reliable contact with the associated rotating blades will be achieved by the arched or bent configuration. In contrast to the prior art, as much mass as possible of the sealing element and/or the damping element also can be shifted as far radially upward as possible.

Further advantages result by forming the cavity on the pressure side and/or on the suction side of the rotating blade. The cooling-air flow can be influenced and adjusted in a targeted manner in this way.

In another advantageous embodiment of the invention, it is provided that the blade neck of at least one rotating blade comprises a relief channel extending between the low-pressure side and the high-pressure side of the rotor. Any stresses can be relieved by means of such a relief channel and the weight of the rotor can be optimized.

In addition, it has been shown to be advantageous if the relief channel is fluidically joined to the cavity. In other words, it is provided that the cooling-air flow can flow through the relief channel into the cavity and from there through the inlet opening into the cooling channel formed inside the blade element. This permits a particularly advantageous guiding of the cooling-air flow and a corresponding reliable cooling of the rotating blade.

An additional improvement for guiding the cooling-air flow is made possible in another embodiment of the invention in that at least one rotating blade comprises at least two and preferably three inlet openings and/or at least two inner cooling channels.

Another aspect of the invention relates to a blade or vane, in particular a rotating blade for a rotor of a turbo machine that has at least one inner cooling channel, which extends at least along a predominant region of a blade element of the blade or vane and an inlet opening formed between a blade foot and a blade platform of the blade for introducing cooling air into the blade element. In this way, an improved provision of cooling air of the blade according to the invention is made possible, since the inlet opening is disposed in a cavity formed radially underneath the blade platform. The advantages resulting therefrom can be taken from the preceding descriptions.

Another aspect of the invention relates to a turbo machine having a rotor and/or a blade according to one of the preceding embodiment examples. The advantages resulting therefrom can be taken from the preceding descriptions. The turbo machine is formed as an aircraft turbine in a further preferred embodiment.

BRIEF DESCRIPTION OF THE DRAWINGS

Further features of the invention result from the claims, the examples of embodiment, as well as on the basis of the drawings. The features and combinations of features named above in the description, as well as features and combinations of features named in the following for the examples of embodiment are applicable not only in the combination indicated in each case, but are also applicable in other combinations or by themselves, without departing from the scope of the invention. Herein:

DETAILED DESCRIPTION OF THE INVENTION

Figure 1:
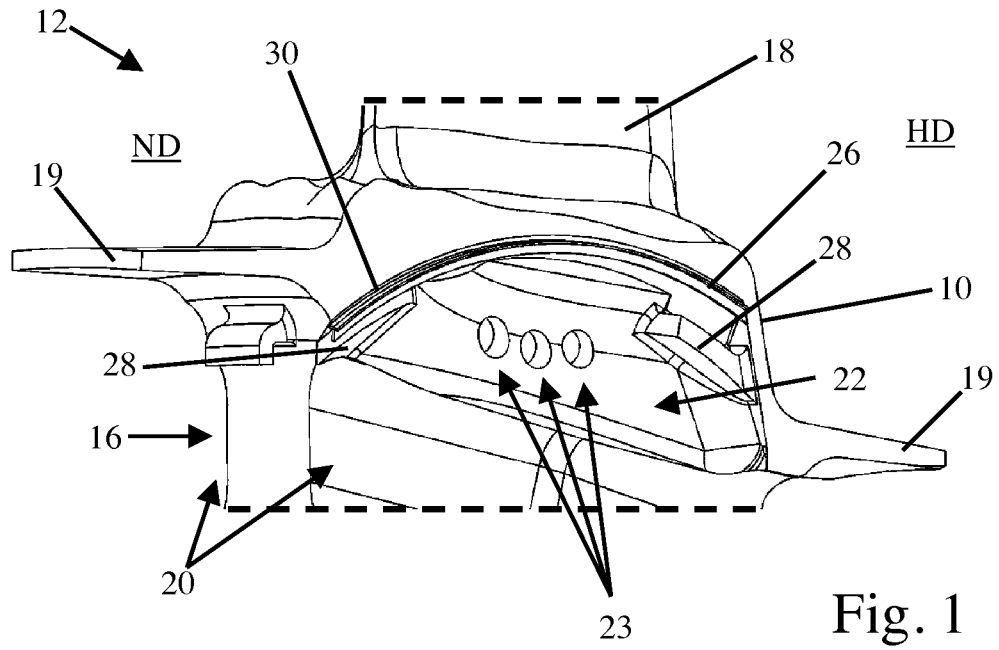
FIG. 1 shows a schematic perspective view of a rotating blade viewed from the low-pressure side of a rotor.
Figure 2:
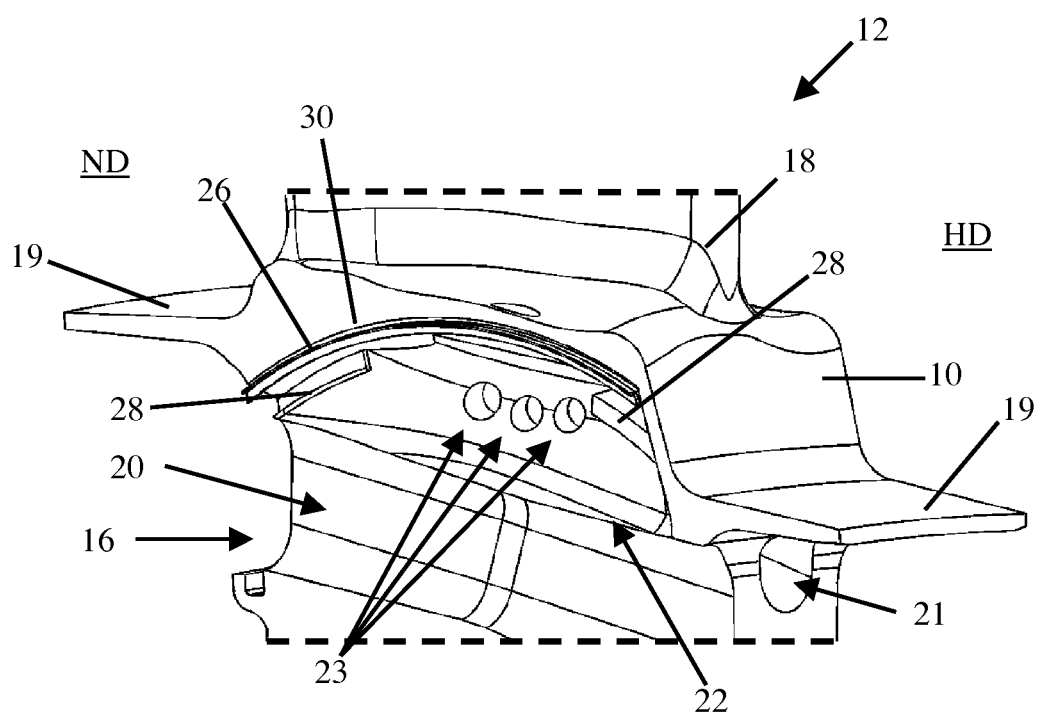
FIG. 2 shows a schematic perspective view of the rotating blade shown in FIG. 1 viewed from the high-pressure side of the rotor.

FIG. 1 shows a schematic perspective view of a rotating blade 12 seen from the low-pressure (ND) side of a rotor (not shown). FIG. 1 will be explained in the following in conjunction with FIG. 2, in which a schematic perspective view of the rotating blade 12 shown in FIG. 1 is illustrated, viewed from the high-pressure (HD) side of the rotor.

The rotor, which is designed presently in integral BLISK (Bladed Disk) construction for a turbine stage of an aircraft engine, comprises a basic rotor body 14 (see FIG. 3), which is joined cohesively in a way known in and of itself to several rotating blades 12. A radially inner region (relative to an axis of rotation of the rotor) of a blade element 18 connecting to a blade platform 10 can be recognized in FIG. 1 for the illustrated rotating blade 12. Blade platform 10, together with projections formed on the low-pressure (ND) side and the high-pressure (HD) side of the rotor, forms a blade shroud 19 for the at least partial boundaries of a flow channel of the aircraft engine. In other words, blade platform 10 defines the radially inner boundary for the hot combustion gases of the turbine stage.

In order to avoid high thermal stresses in basic rotor body 14, a blade neck 16 of rotating blade 12 has relief channels or slots 20 running on both sides in the axial direction between the low-pressure (ND) and high-pressure (HD) sides of the rotor. The relief channels 20 formally define the radially outer, uninterrupted edge of the solid basic rotor body 14. In addition, rotating blade 12 comprises a channel 21 on the side of the blade neck. Radially above depressions 20, on both sides, each rotating blade 12 has a cavity 22, which is formed radially below blade platform 10 and radially above blade neck 16. Alternatively, it may be provided that cavity 22 is formed only on the pressure side or only on the suction side of the respective rotating blade 12.

In the present example of embodiment, three inlet openings 23 are formed in the wall of each cavity 22. Cooling air for cooling the blade element 18 can thus enter through relief channel 21 on the side of the blade neck into cavity 22 underneath blade platform 10 and from here through inlet openings 23 into one or more inner cooling channels (not shown) of rotating blade 12 (see FIG. 3).

In other words, cooling air for rotating blade 12 is introduced via inlet openings 23, which are formed in the wall of cavity 22 formed radially underneath blade platform 10. Therefore, an optimal geometry can be selected for the inlet cross sections of inlet openings 23 and for the border material regions, since this region of rotating blade 12, in contrast to blade foot 32 (see FIG. 3), hardly brings about a structural or aerodynamic restriction for blade neck 16 or blade element 18.

In order to at least prevent as much as possible an undesired gas exchange and in particular to avoid a loss of cooling air in the radial direction between adjacent rotating blades 12, a basically optional sealing element 26 that is formed presently in T-shaped cross section is associated with blade platform 10 in the present example of embodiment. It should be emphasized, however, that sealing element 26 may also basically have different cross-sectional geometries. Alternatively or in addition to the sealing element 26 that is shown, a damping element (not shown) for damping blade vibrations can be disposed in each case inside cavity 22 or between adjacent blade platforms 10 of two rotating blades 12. The damping element can be disposed, for example, radially underneath sealing element 26 and can be joined to it. For this purpose, sealing element 26, for example, can be plugged into a corresponding groove of the damping element. The damping element also can be basically formed and/or used for improved sealing of the gap.

Blade platform 10 comprises a guide element 28 in the region of the low-pressure (ND) and the high-pressure (HD) sides in each case. On the inner wall of blade platform 10 is provided a contact surface 30, and sealing element 26 and/or optionally the damping element is brought into contact with this contact surface at least during the operation of the rotor. Guide elements 28 and contact surface 30 are each arched or bent radially upward, by which means sealing element 26 and/or optionally, the damping element(s) is or are also arched radially upward in the mounted state. In this way, due to the centrifugal forces occurring during the operation of the rotor, it is (they are) applied reliably to contact surface 30, by which means a particularly high sealing and/or damping effect is also achieved in addition to a stable symmetrical self-alignment. In addition, the arched guide elements 28 and the arched contact surface 30 simplify both the mounting as well as the demounting of sealing element 26 or of the damping element, for example, for repairing and/or overhauling rotor 13. In addition, as much mass as possible can be disposed radially upward as far as possible by the arching. Preferably, sealing element 26 or the damping element moves out from the low-pressure (ND) side into cavity 22 of blade platform 10, the guide elements 28 and the arched contact surface 30 functioning as guiding and sliding surfaces. Sealing element 26 and/or the damping element alternatively can also be designed with multiple parts and mounted or demounted from both HD (high-pressure) and ND (low-pressure) sides. In the present example of embodiment, blade platform 10 is formed on its side facing the high-pressure (HD) side in such a way that sealing element 26 or the damping element strikes the platform upon reaching the mounting position.

Figure 3:
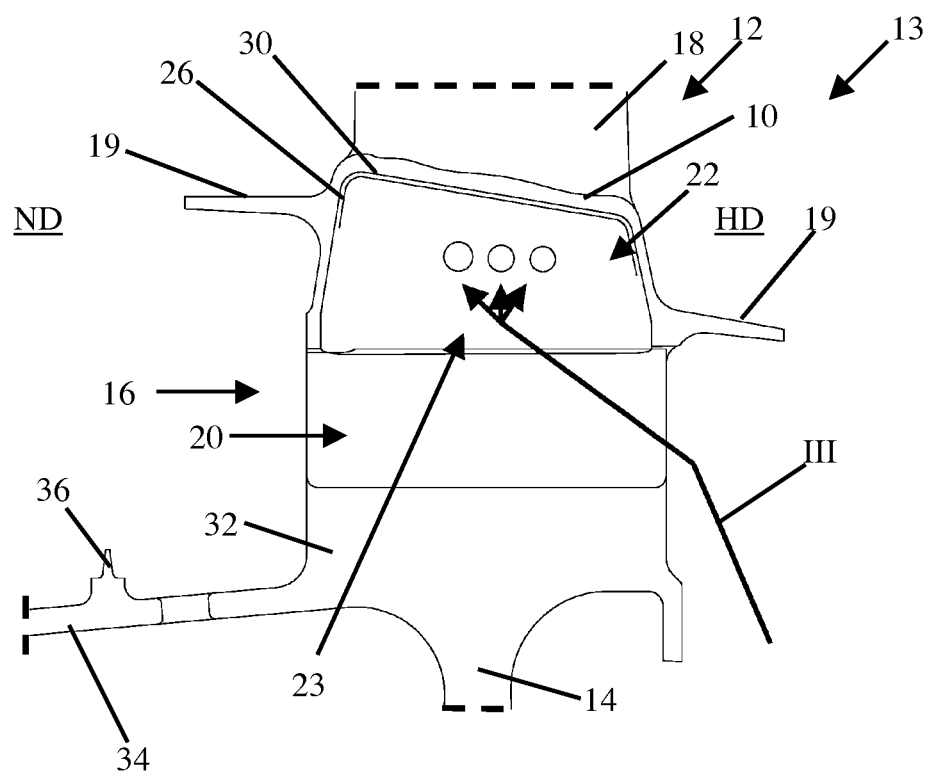
FIG. 3 shows a schematic lateral sectional view of a rotor, in which a cooling-air flow into inlet openings of a cooling channel of a rotating blade of the rotor is illustrated.

FIG. 3 shows a schematic lateral sectional view of a rotor 13. The structure of rotating blade 12 essentially corresponds to that of the preceding example of embodiment. The rotating blade 12 shown in FIG. 3, however, unlike the previous example of embodiment, does not have guide elements 28. As can be seen in FIG. 3, rotating blade 12 is joined to basic rotor body 14 via its blade foot 32. In addition, rotor 13 comprises a drum 34, which is known in and of itself, having a sealing element 36.

A cooling-air flow into inlet openings 23 of an inner-lying cooling channel (not shown) of rotating blade 12 of rotor 13 is illustrated schematically by arrows III. In this way, it can be recognized that the cooling air flows from the high-pressure (HD) side via the relief channel 20 on the side of the blade neck into cavity 22 underneath blade platform 10 and from here through inlet openings 23 into the one or more cooling channels. In this example of embodiment also, cavity 22 is sealed radially upward by a sealing element 26 applied to contact surface 30.

What is claimed is:

1. A rotor (13) for a turbo machine having rotating blades (12), which are joined to a basic rotor body (14), at least one rotating blade (12) having at least one inner cooling channel, which extends at least along a region of a blade element (18) of the respective rotating blade (12) and comprises an inlet opening (23) for introducing cooling air into the blade element (18), said inlet opening (23) is formed between a blade foot (32) and a blade platform (10) of the respective rotating blade (12), a cavity wall formed on the rotating blade, the cavity wall defining a cavity (22), the cavity being formed radially underneath the blade platform (10);

relief channels (20) defined on a blade neck of at least one rotating blade, each relief channel extending between a low-pressure (ND) side and a high-pressure side (HD) of the rotor (13);

the cavity being formed adjacent one of the relief channels and being fluidly connected to the respective relief channel;

wherein the inlet opening (23) is disposed in the cavity (22), whereby cooling air can enter through the respective relief channel into the cavity and then pass through the inlet opening (23) into the respective cooling channel;

wherein the cavity (22) is radially above the respective relief channel (20).

2. The rotor (13) according to claim 1, wherein the rotating blades (12) are joined to the basic rotor body (14) in a detachable manner or cohesively.

3. The rotor (13) according to claim 1, wherein the blade platform (10) of at least one rotating blade (12) forms a radially inner blade shroud (19) for at least partially bounding a flow channel of the turbo machine.

4. The rotor (13) according to claim 1, further comprising: a sealing element (26), by means of which an exchange of flow medium in the radial direction between adjacent rotating blades (12) can be at least reduced thereby, disposed between two adjacent rotating blades (12).

5. The rotor (13) according to claim 4, wherein an innerlying contact surface (30) is provided in the radially outer region of at least one blade platform (10), and the sealing element (26) can be brought into contact with this contact surface, at least during the operation of the rotor (13).

6. The rotor (13) according to claim 4, wherein the sealing element (26) is arched radially upward along its axial extent.

7. The rotor (13) according to claim 1, wherein the cavity (22) is formed on a pressure side and/or on a suction side of rotating blade (12).

8. The rotor (13) according to claim 1, wherein at least one rotating blade (12) comprises at least two inlet openings (23).

9. The rotor (13) according to claim 1 wherein the at least one inner cooling channel extends at least along a predominant region of the blade element (18) of the respective blade.

10. The rotor (13) according to claim 1, wherein at least one rotating blade (12) comprises at least two inner cooling channels.

11. The rotor (13) according to claim 1, wherein the inlet opening (23) is disposed in the cavity so that it is radially above an inner blade shroud on the high-pressure side of the rotor.

* * * * *